(12) United States Patent
Kalt et al.

(10) Patent No.: US 11,572,040 B2
(45) Date of Patent: Feb. 7, 2023

(54) METHOD FOR DETECTING THE THEFT OF A VEHICLE

(71) Applicant: Vitesco Technologies GmbH, Hannover (DE)

(72) Inventors: Urs Kalt, Munich (DE); Bernhard Michel, Munich (DE)

(73) Assignee: Vitesco Technologies GmbH

( * ) Notice: Subject to any disclaimer, the term of this patent is extended or adjusted under 35 U.S.C. 154(b) by 4 days.

(21) Appl. No.: 17/282,164

(22) PCT Filed: Oct. 1, 2019

(86) PCT No.: PCT/EP2019/076656
§ 371 (c)(1),
(2) Date: Apr. 1, 2021

(87) PCT Pub. No.: WO2020/070166
PCT Pub. Date: Apr. 9, 2020

(65) Prior Publication Data
US 2022/0009448 A1  Jan. 13, 2022

(30) Foreign Application Priority Data
Oct. 5, 2018 (DE) .................... 10 2018 217 079.7

(51) Int. Cl.
*B60R 25/32* (2013.01)
*B60R 25/10* (2013.01)
(Continued)

(52) U.S. Cl.
CPC ............ *B60R 25/32* (2013.01); *B60R 25/102* (2013.01); *B60R 25/1004* (2013.01);
(Continued)

(58) Field of Classification Search
CPC ... B60R 25/32; B60R 25/1004; B60R 25/102; B60R 25/104; B60R 25/30; G01P 13/00;
(Continued)

(56) References Cited

U.S. PATENT DOCUMENTS 5,184,023 A * 2/1993 Carlo ...................... B60R 25/04
307/10.3
5,654,686 A * 8/1997 Geschke ............. B60R 25/1004
701/530
(Continued)

FOREIGN PATENT DOCUMENTS

CN 103568858 A 2/2014
CN 204659475 U 9/2015
(Continued)

OTHER PUBLICATIONS

German Examination Report for German Application No. 10 2018 217 079.7, dated May 28, 2019, 6 pages.
(Continued)

*Primary Examiner* — Adnan Aziz
(74) *Attorney, Agent, or Firm* — RatnerPrestia

(57) ABSTRACT

A method for detecting theft of a vehicle, includes the following steps: detecting a vehicle movement by an inductive vehicle charging system, checking the authorization for a detected vehicle movement, and outputting a message signal if an unauthorized vehicle movement is detected. The checking of the authorization for a detected vehicle movement is started after the start of a vehicle charging process.

14 Claims, 1 Drawing Sheet

(51) Int. Cl.
  *B60R 25/102* (2013.01)
  *B60R 25/104* (2013.01)
  *G08B 7/06* (2006.01)
  *G01P 13/00* (2006.01)
  *G01V 3/10* (2006.01)

(52) U.S. Cl.
  CPC ............ *B60R 25/104* (2013.01); *G01P 13/00* (2013.01); *G01V 3/10* (2013.01); *G08B 7/06* (2013.01)

(58) Field of Classification Search
  CPC .. G01V 3/10; G08B 7/06; Y02T 10/70; Y02T 10/7072; Y02T 90/12; Y02T 90/14; Y02T 90/16; B60L 53/12; B60L 53/126; B60L 53/66; G07C 9/00174; G07C 5/0816
  See application file for complete search history.

(56) References Cited

U.S. PATENT DOCUMENTS

| | | | |
|---|---|---|---|
| 8,686,686 | B2 | 4/2014 | Boot |
| 8,896,321 | B2* | 11/2014 | Taguchi ................ B60L 53/122 324/654 |
| 9,701,212 | B2* | 7/2017 | Baarman ................ B60L 53/65 |
| 10,011,182 | B2 | 7/2018 | Salter et al. |
| 2010/0277296 | A1* | 11/2010 | DeMille ................ B60R 25/10 340/426.1 |
| 2010/0320964 | A1* | 12/2010 | Lathrop ................ B60K 6/365 320/109 |
| 2011/0316553 | A1* | 12/2011 | Taguchi ................ B60L 53/122 324/500 |
| 2013/0249682 | A1* | 9/2013 | Van Wiemeersch .... H02J 50/60 320/108 |
| 2013/0313895 | A1* | 11/2013 | Asselin ............... H02J 7/00047 307/9.1 |
| 2014/0015522 | A1* | 1/2014 | Widmer ................ B60L 53/36 324/239 |
| 2014/0021912 | A1 | 1/2014 | Martin et al. |
| 2014/0152422 | A1* | 6/2014 | Breed ................ B60R 25/25 340/5.52 |
| 2014/0203768 | A1* | 7/2014 | Andic ................ B60L 53/66 320/108 |
| 2015/0274023 | A1* | 10/2015 | Houivet ................ B60L 53/22 320/108 |
| 2015/0274183 | A1* | 10/2015 | Lozano ................ B61L 25/021 246/122 R |
| 2016/0178740 | A1* | 6/2016 | Sieber ................ B60L 53/36 342/43 |
| 2017/0174093 | A1* | 6/2017 | Oettle ................ H02J 7/0021 |
| 2017/0282855 | A1* | 10/2017 | Barrios ................ B60R 25/32 |
| 2019/0232918 | A1* | 8/2019 | Kupka ................ B60L 53/30 |

FOREIGN PATENT DOCUMENTS

| | | |
|---|---|---|
| CN | 107225982 A | 10/2017 |
| DE | 102010043056 A1 | 5/2012 |
| DE | 102011077472 A1 | 12/2012 |
| DE | 102011077474 A1 | 12/2012 |
| DE | 112012002869 T5 | 3/2014 |
| DE | 102015221619 A1 | 5/2017 |
| DE | 102016213055 A1 | 1/2018 |
| EP | 3252962 A1 | 12/2017 |
| JP | 2002362318 A | 12/2002 |

OTHER PUBLICATIONS

International Search Report and Written Opinion for International Application No. PCT/EP2019/076656, dated Dec. 10, 2019, with partial English translation, 17 pages.
International Search Report and Written Opinion for International Application No. PCT/EP2019/076656, dated Dec. 10, 2019, 15 pages (German).
Chinese Office Action for Chinese Application No. 201980065561.0, dated Apr. 28, 2022, with partial English translation, 11 pages.

* cited by examiner

METHOD FOR DETECTING THE THEFT OF A VEHICLE

CROSS REFERENCE TO RELATED APPLICATIONS

This application is the U.S. National Phase Application of PCT International Application No. PCT/EP2019/076656, filed Oct. 1, 2019, which claims priority to German Patent Application No. 10 2018 217 079.7, filed Oct. 5, 2018, the contents of such applications being incorporated by reference herein.

FIELD OF THE INVENTION

The invention relates to a method for detecting theft of a vehicle.

BACKGROUND OF THE INVENTION

A large number of vehicles are stolen every day. Modern vehicle theft detection is based, among other things, on detecting an unauthorized movement of the vehicle, as occurs, for example, when the vehicle is towed in an unauthorized manner, or when the vehicle is started without the use of a vehicle-specific key.

A vehicle movement is detected using sensors. Due to existing technical limitations, they cannot detect all vehicle movements based on vehicle theft.

To check the plausibility of a vehicle movement, it is possible to use systems which as such are not provided for the purpose of detecting theft, for example tire pressure detection, as described in JP 2002 362 318 A, incorporated herein by reference.

SUMMARY OF THE INVENTION

An aspect of the invention is a method for detecting theft of a vehicle that can be implemented with little effort.

According to an aspect of the present invention, the following steps are carried out in a method for detecting theft of a vehicle:
 detecting a vehicle movement by means of an inductive vehicle charging system,
 checking the authorization for a detected vehicle movement, and
 outputting a message signal if an unauthorized vehicle movement is detected,
 wherein the authorization for a detected vehicle movement is checked after the start of a vehicle charging process.

The checking of the authorization for a detected vehicle movement is preferably continued after the vehicle charging process has ended until an authorized vehicle movement is detected. This ensures that theft of the vehicle positioned on a ground plate of the vehicle charging system after the vehicle charging process has ended is also detected.

An authorized vehicle movement is preferably detected when it is detected after the vehicle has been started by means of a vehicle-specific vehicle key. This makes it possible to ensure that only a person who is in possession of the vehicle-specific vehicle key can drive the vehicle away from the ground plate of the inductive vehicle charging system.

The vehicle can be additionally protected against theft by virtue of the fact that an individual code has to be input on the vehicle charging system before the vehicle is driven away from the ground plate of the inductive vehicle charging system.

Vehicle movements can be detected by different subsystems of an inductive vehicle charging system, for example by capturing the coil current during the charging process, in the context of foreign object detection, living object detection or by a vehicle positioning system. These and other possible ways of detecting vehicle movements are evaluated in an aspect of the present invention for the purpose of detecting theft.

BRIEF DESCRIPTION OF THE DRAWINGS

Further advantageous properties of an aspect of the invention emerge from the exemplary explanation thereof, given with reference to the figures.

DETAILED DESCRIPTION OF THE PREFERRED EMBODIMENTS

Figure 1:
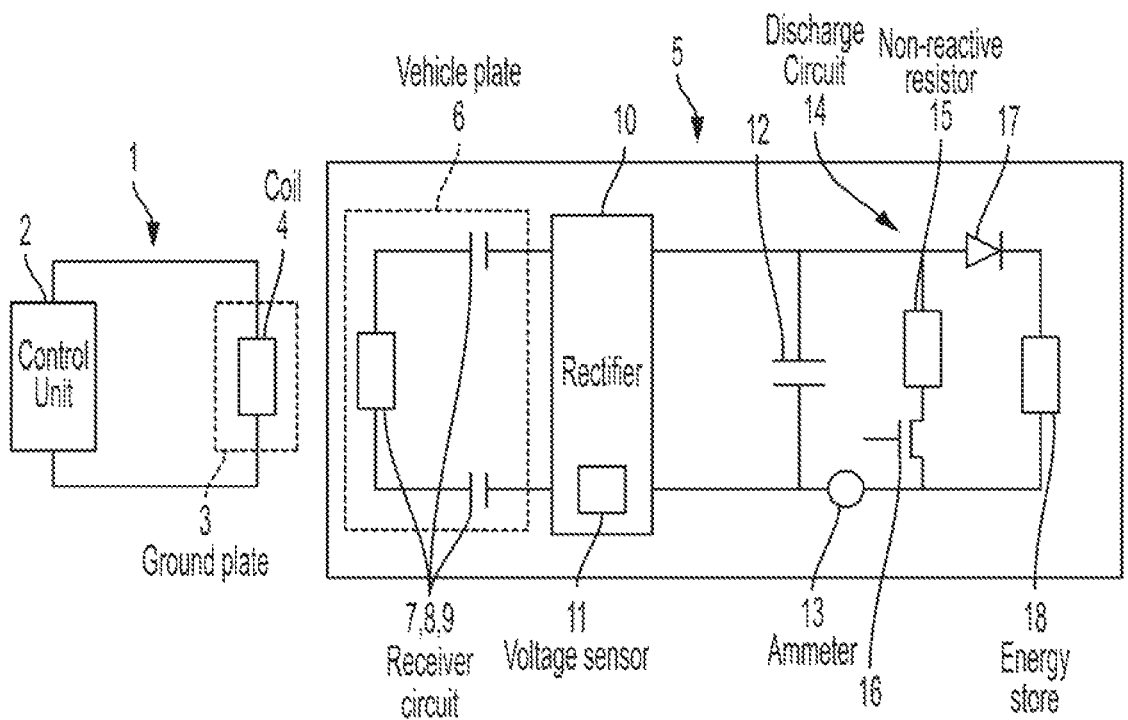
FIG. 1 shows a block diagram of an inductive vehicle charging system.

The inductive vehicle charging system shown in FIG. 1 has a charging station 1, to which a control unit 2 and a ground plate 3 belong. A coil 4 is arranged in the ground plate 3. As an alternative to the exemplary embodiment shown in FIG. 1, the control unit 2 can also be an integrated part of the ground plate 3.

Furthermore, FIG. 1 illustrates a vehicle 5, in or on which the vehicle-side subsystems of the inductive vehicle charging system are arranged. These vehicle-side subsystems include, among other things, a receiver circuit 7, 8, 9, which is needed to transmit energy and is arranged in a vehicle plate 6, a rectifier 10, a voltage sensor 11, a filter capacitor 12, an ammeter 13, a discharge system 14 and an energy store 18. The receiver circuit contains a resonator coil 7 and resonator capacitors 8 and 9. The discharge system 14 has a non-reactive resistor 15, a transistor 16 and a diode 17.

In the inductive vehicle charging system illustrated in FIG. 1, energy is wirelessly transmitted from the charging station 1 to the vehicle 5 using a transmitter, which belongs to the charging station and is the coil 4 arranged in the ground plate 3, and the vehicle-side receiver circuit, to which the resonator coil 7 and the resonator capacitors 8 and 9 belong.

The resonator coil 7 is connected, via the resonator capacitors 8 and 9, to the rectifier 10, in which the signal received by the receiver circuit 7, 8, 9 is rectified.

The output signal from the rectifier 10 is fed, via the filter capacitor 12 and the ammeter 13, to the discharge system 14 which has the non-reactive resistor 15, the transistor 16 and the diode 17. The energy store 18, in which the transmitted energy is stored, is connected to this discharge system 14.

For safety reasons, the inductive vehicle charging system needs to be monitored during the charging process. As part of this monitoring, among other things, a measurement of the coil current flowing through the resonator coil 7, a measurement of a voltage present in the rectifier 10 by means of the voltmeter 11, foreign object detection, living object detection and monitoring of the vehicle position using positioning sensors are carried out. The monitoring specified above is intended to ensure that no damage to the charging system, no damage to the vehicle to be charged and no personal injury can occur during the vehicle charging process. Furthermore, the monitoring described above is intended to ensure that the close coupling between the ground-side coil 4 and the vehicle-side coil 7, which is necessary for an effective charging process, is maintained during the entire charging process.

In the monitoring described above, movement information is determined, among other things. This movement information is used in an aspect of the present invention to detect vehicle theft.

Figure 2:
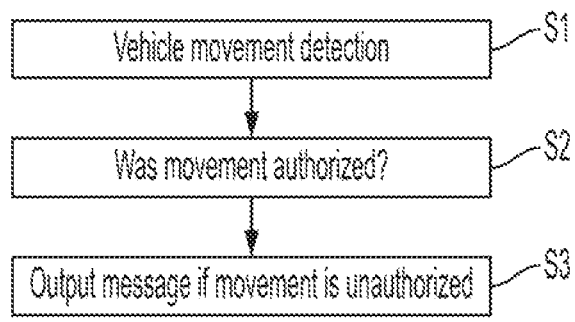
FIG. 2 shows a block diagram of a method for detecting theft.

To detect vehicle theft, as is apparent from FIG. 2, a vehicle movement is detected in a step S1 using the inductive vehicle charging system. Then, in a step S2, it is checked whether a detected vehicle movement is authorized or unauthorized.

An unauthorized vehicle movement is present when the vehicle is driven away from the ground plate 3 or otherwise removed in an unauthorized manner during the charging process.

An authorized vehicle movement is present if the moving vehicle is intended to be moved over the vehicle plate 3 by an authorized driver, who may be the owner of the vehicle or an authorized service person, into a position that is as optimal as possible for a charging process before the start of the charging process.

An authorized vehicle movement is also present if the vehicle is started and driven away using a vehicle-specific vehicle key after the charging process has ended.

Additional security against vehicle theft can be achieved by virtue of the fact that an authorized vehicle movement is detected only when the vehicle is started using a vehicle-specific vehicle key after the charging process has ended and when there is additionally release by means of a release signal output by a communication device, e.g. a cellphone. In this case, a person who has come into possession of the vehicle-specific vehicle key in an unauthorized manner cannot drive the vehicle away from the ground station despite having the vehicle-specific key, unless they also have the cellphone and can input the release code.

The check of whether a detected vehicle movement is authorized or unauthorized is started only when the preparatory actions for the charging process, for example the above-mentioned exact positioning of the vehicle above the ground plate, have been completed, and the charging process has been released and/or started.

If an unauthorized vehicle movement is detected during the charging process, a message signal is output in step S3. This message signal is an acoustically perceptible message signal and/or a visually perceptible message signal.

This message signal is output to an alarm transmitter arranged in the vehicle and/or an alarm transmitter arranged on the charging station and/or a mobile communication device and/or an alarm system arranged elsewhere. Furthermore, the above-mentioned message signal can be output in order to notify an immobilizer which is arranged in the vehicle and blocks the vehicle from driving away.

A vehicle movement is advantageously detected using components of the inductive charging system that are present anyway.

One embodiment involves detecting a vehicle movement by evaluating the coil current of the inductive vehicle charging system measured by means of the ammeter 13. If, during the charging process, the coil current measured by means of the ammeter 13 deviates from a known coil current customary during the charging process by more than a predefined tolerance amount, presence of an unauthorized vehicle movement is detected.

A further embodiment involves detecting a vehicle movement by evaluating a voltage measured by means of the voltmeter 11 in the rectifier 10. If this measured voltage deviates during the charging process from a known voltage customary during the charging process and if the measured voltage is also outside a predefined tolerance range, presence of an undesired vehicle movement is detected.

A further embodiment involves detecting a vehicle movement by evaluating a determined impedance of the inductive vehicle charging system. If undesired impedance changes occur during a vehicle charging process, presence of an undesired vehicle movement is detected.

A further embodiment involves detecting a vehicle movement using foreign object detection of the inductive vehicle charging system.

A further embodiment involves detecting a vehicle movement using living object detection of the inductive vehicle charging system.

A further embodiment involves detecting a vehicle movement on the basis of an evaluation of output signals from positioning sensors of the inductive vehicle charging system. The output signals from these positioning sensors are used within the scope of the preparatory actions for the charging process to exactly position the vehicle above the ground-side coil of the vehicle charging system. After the start of the charging process, the output signals from the positioning sensors can advantageously be used to detect an unauthorized vehicle movement and thus vehicle theft.

A further embodiment involves evaluating the coupling relationship between the ground-side coil 4 and the vehicle-side coil 7 in order to detect a vehicle movement occurring during the charging process. If this coupling relationship worsens considerably in a short period of time, it can be concluded from this that there is an unauthorized vehicle movement and thus vehicle theft.

A further embodiment involves evaluating magnetic field changes occurring on the vehicle side of the inductive vehicle charging system in order to detect a vehicle movement.

To increase the reliability of theft detection, a plurality of the aforementioned embodiments can advantageously be used together.

A plausibility check of an unauthorized movement of the vehicle detected by means of one or more of the aforementioned embodiments can also be carried out using one or more further embodiments of the aforementioned embodiments.

In the light of the foregoing, in an aspect of the present invention, a vehicle movement is detected by means of an inductive charging system. It is then checked whether the detected vehicle movement is an authorized vehicle movement. An authorized vehicle movement is present, for example, when the vehicle is positioned above a ground plate of the charging system before the start of the charging process in order to achieve a good coupling relationship between a transmission coil arranged in the ground plate and a resonator coil, which is arranged on or in the vehicle and, together with resonator capacitors, forms a receiver circuit, which coupling relationship is necessary for an effective charging process. An unauthorized vehicle movement is present when this vehicle movement takes place after the completion of preparatory actions prior to the charging process, including the aforementioned vehicle positioning, and the charging process has been released and has been started. If such an unauthorized vehicle movement is detected, the presence of vehicle theft is assumed and a message signal is output and is used to trigger an acoustic alarm signal and/or a visually perceptible alarm signal. In order to avoid triggering false alarms, checking of the authorization for a detected vehicle movement is started only after the start of a vehicle charging process. The check of whether there is an unauthorized vehicle movement is advantageously continued after the end of the charging process until the vehicle is driven away from the ground plate of the charging station by an authorized person who is in possession of a vehicle-specific vehicle key and has started the vehicle using this key.

This authorized driving of the vehicle away from the ground plate of the inductive vehicle charging system is detected as a release of the charging station and can be used to visually signal the charging station as free to the driver of a vehicle waiting for a free charging point, for example by means of a suitable display device.

Another option is to provide a bidirectional option for charging and discharging. This also makes it possible to transmit energy from the vehicle to the ground station.

The invention claimed is:

1. A method for detecting theft of a vehicle, comprising:
   detecting a vehicle movement by an inductive vehicle charging system,
   checking the authorization for a detected vehicle movement,
   outputting a message signal if an unauthorized vehicle movement is detected,
   determining that a vehicle positioning process is complete and that the vehicle charging process has started, and
   after determining that a vehicle positioning process is complete and that the vehicle charging process has started, start checking of the authorization for a detected vehicle movement.

2. The method as claimed in claim 1, in which, in order to detect the vehicle movement, a measured coil current or a measured voltage of the inductive vehicle charging system is evaluated.

3. The method as claimed in claim 1, in which an impedance of the inductive vehicle charging system is evaluated in order to detect the vehicle movement.

4. The method as claimed in claim 1, in which the vehicle movement is detected on the basis of foreign object detection of the inductive vehicle charging system.

5. The method as claimed in claim 1, in which the vehicle movement is detected on the basis of living object detection of the inductive vehicle charging system.

6. The method as claimed in claim 1, in which the vehicle movement is detected on the basis of an evaluation of the output signals from positioning sensors.

7. The method as claimed in claim 1, in which an acoustically perceptible and/or a visually perceptible alarm signal is output as the message signal.

8. The method as claimed in claim 7, in which the alarm signal is output to an alarm transmitter arranged in the vehicle and/or an alarm transmitter arranged on the charging station of the inductive vehicle charging system and/or to a mobile communication device and/or to an alarm system.

9. The method as claimed in claim 1, in which an immobilizer arranged in the vehicle is notified when an unauthorized vehicle movement is detected.

10. The method as claimed in claim 1, in which the coupling relationship between a primary side and a secondary side of the inductive vehicle charging system is evaluated in order to detect a vehicle movement.

11. The method as claimed in claim 1, in which magnetic field changes on the vehicle side of the inductive vehicle charging system are evaluated in order to detect a vehicle movement.

12. An inductive vehicle charging system adapted to detect theft of a vehicle according to the method of claim 1.

13. A method for detecting theft of a vehicle, comprising:
    detecting a vehicle movement by an inductive vehicle charging system,
    checking the authorization for a detected vehicle movement,
    outputting a message signal if an unauthorized vehicle movement is detected,
    determining that a vehicle positioning process is complete and that the vehicle charging process has started,
    after determining that a vehicle positioning process is complete and that the vehicle charging process has started, start checking of the authorization for a detected vehicle movement, and
    continuing the checking of the authorization for the detected vehicle movement after the vehicle charging process has ended and until an authorized vehicle movement is detected.

14. A method for detecting theft of a vehicle, comprising:
    detecting a vehicle movement by an inductive vehicle charging system,
    checking the authorization for a detected vehicle movement,
    outputting a message signal if an unauthorized vehicle movement is detected,
    determining that a vehicle positioning process is complete and that the vehicle charging process has started,
    after determining that a vehicle positioning process is complete and that the vehicle charging process has started, start checking of the authorization for a detected vehicle movement, and
    detecting an authorized vehicle movement after the vehicle has been started by a vehicle-specific vehicle key and/or after release by a release signal output by a communication device.

* * * * *